US 8,840,712 B2

(12) United States Patent
Kitamura et al.

(10) Patent No.: US 8,840,712 B2
(45) Date of Patent: Sep. 23, 2014

(54) EVAPORATIVE EMISSION CONTROL SYSTEM

(75) Inventors: Hiroshi Kitamura, Wako (JP); Koichi Hidano, Wako (JP); Ayumu Horiba, Wako (JP); Masakazu Kitamoto, Wako (JP); Yoshikazu Kaneyasu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 13/293,122

(22) Filed: Nov. 10, 2011

(65) Prior Publication Data

US 2012/0118159 A1   May 17, 2012

(30) Foreign Application Priority Data

Nov. 11, 2010   (JP) .................. 2010-252532

(51) Int. Cl.
*B01D 53/02* (2006.01)
*F02M 25/08* (2006.01)
*F02M 37/00* (2006.01)
*B60K 15/035* (2006.01)

(52) U.S. Cl.
CPC ......... *F02M 37/0047* (2013.01); *F02M 25/089* (2013.01); *B60K 15/035* (2013.01); *B01D 2259/4516* (2013.01)
USPC ................. 96/110; 96/116; 96/144; 123/519; 95/146; 55/385.3

(58) Field of Classification Search
CPC .................................................... B60K 15/035
USPC .............. 96/187, 243, 293, 344, 353; 137/80, 137/81.1, 202, 587, 588; 220/86.1
See application file for complete search history.

(56) References Cited

U.S. PATENT DOCUMENTS 5,373,957 A * 12/1994 Gryc ........................... 220/86.1
5,392,804 A *  2/1995 Kondo et al. ................. 137/202

FOREIGN PATENT DOCUMENTS

| JP | 63-101220 U | 7/1988 |
| JP | 03-42718 U | 4/1991 |
| JP | 2004-156495 | 6/2004 |
| JP | 2008-008238 | * 1/2008 ............. F02M 37/00 |

OTHER PUBLICATIONS

Japanese Office Action for corresponding JP Application No. 2010-252532, Oct. 15, 2012.
Japanese Office Action for corresponding JP Application No. 2010-252532, Jun. 17, 2013.

* cited by examiner

*Primary Examiner* — Duane Smith
*Assistant Examiner* — Joubert X Glover
(74) *Attorney, Agent, or Firm* — Mori & Ward, LLP

(57) ABSTRACT

An evaporative emission control system includes a fuel tank, a canister, a normally-closed control valve, a filler pipe, and a breather pipe. The fuel tank is to store fuel. The canister is to adsorb evaporative fuel generated in the fuel tank. The normally-closed control valve is provided in a vapor passage connecting the fuel tank to the canister. The fuel is delivered to the fuel tank through the filler pipe. The breather pipe includes a communicating passage, an opening, and at least one hole. The communicating passage connects the fuel tank to the filler pipe. The opening is provided at a first end of the breather pipe in the fuel tank. The opening is located below a predetermined fuel level in the fuel tank. The at least one hole is located above the predetermined fuel level in the fuel tank.

9 Claims, 3 Drawing Sheets

EVAPORATIVE EMISSION CONTROL SYSTEM

CROSS-REFERENCE TO RELATED APPLICATIONS

The present application claims priority under 35 U.S.C. §119 to Japanese Patent Application No. 2010-252532, filed Nov. 11, 2010, entitled "Evaporative Emission Control System". The contents of this application are incorporated herein by reference in their entirety.

BACKGROUND OF THE INVENTION

1. Field of the Invention

The present invention relates to an evaporative emission control system.

2. Discussion of the Background

In order to prevent evaporative fuel from escaping into the atmosphere from a fuel tank during refueling, conventional evaporative emission control systems cause a canister to adsorb the evaporative fuel and thereby reduce a pressure inside the fuel tank (for example, see Japanese Unexamined Patent Application Publication No. 2004-156495).

In the conventional evaporative emission control systems, a filler pipe through which fuel is delivered to a fuel tank is usually plugged with a filler cap. A communicating passage that communicates between the fuel tank and the filler pipe is also provided in the systems in such a manner that its end at the fuel tank side is immersed in the fuel when the fuel tank is full, in order to cause a fuel dispensing nozzle to automatically stop dispensing fuel or prevent evaporative fuel in the fuel tank from being released to the outside through the communicating passage.

SUMMARY OF THE INVENTION

According to one aspect of the present invention, an evaporative emission control system comprises a fuel tank, a canister, a normally-closed control valve, a filler pipe, and a breather pipe. The fuel tank is to store fuel. The canister is to adsorb evaporative fuel generated in the fuel tank. The normally-closed control valve is provided in a vapor passage connecting the fuel tank to the canister. The fuel is delivered to the fuel tank through the filler pipe. The breather pipe comprises a communicating passage, an opening, and at least one hole. The communicating passage connects the fuel tank to the filler pipe. The opening is provided at a first end of the breather pipe in the fuel tank. The opening is located below a predetermined fuel level in the fuel tank. The at least one hole is located above the predetermined fuel level in the fuel tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3A is a diagram showing a breather pipe of an evaporative emission control system according to an embodiment of the present invention. FIG. 3B is a diagram showing an example of a modified breather pipe of an evaporative emission control system according to an embodiment.

DESCRIPTION OF THE EMBODIMENTS

Figure 1:
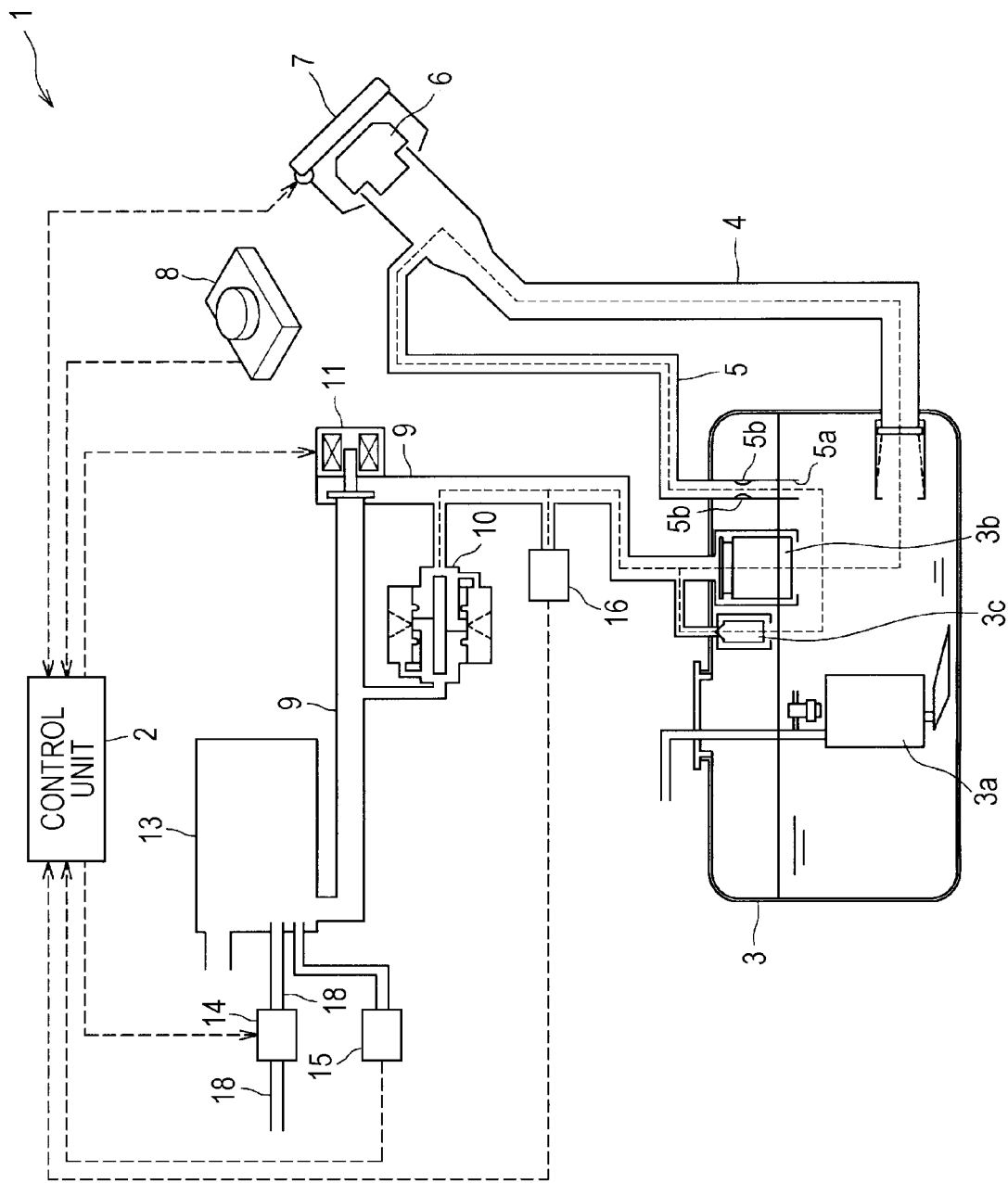
FIG. 1 is a configuration diagram of an evaporative emission control system (when sealing is maintained) according to an embodiment of the present invention.

The embodiments will now be described with reference to the accompanying drawings, wherein like reference numerals designate corresponding or identical elements throughout the various drawings.

The same components in the attached drawings are assigned with the same reference numerals and symbols, and repeated descriptions of the same components are omitted.

FIG. 1 is a configuration diagram of an evaporative emission control system 1 (when sealing is maintained) according to an embodiment of the present invention. The evaporative emission control system 1 includes a vapor passage (piping) 9, a control valve (electromagnetic valve) 11 connected to the vapor passage (piping) 9, a high-pressure 2-way valve 10 connected to the vapor passage (piping) 9 in parallel with the control valve 11, a canister 13 connected to one end of the vapor passage (piping) 9, a purge passage (piping) 18 that is connected at one end thereof to the canister 13 and is connected at the other end thereof to an intake passage (not illustrated) of an internal combustion engine, a purge control valve 14 connected to the purge passage (piping) 18, a pressure sensor 15 for detecting a pressure inside the canister 13, a pressure sensor 16 for detecting a pressure inside a fuel tank 3, and a control unit 2.

The other end of the vapor passage (piping) 9 is connected to the fuel tank 3. A filler pipe 4 and a breather pipe 5 are connected to the fuel tank 3. The breather pipe 5 is a communicating path that communicates between the fuel tank 3 and the filler pipe 4 and has an opening 5a formed at an end thereof in the fuel tank 3. The other end of the breather pipe 5 is connected to an upper portion of the filler pipe 4. An opening at one end of the filler pipe 4 is plugged with a filler cap 6.

A fuel lid 7 is provided at a position in a vehicle body (not illustrated) at which the opening of the filler pipe 4 and the filler cap 6 are located, and plays a role as a lid of the filler cap 6. The fuel lid 7 has a locking mechanism and remains locked in the closed position through the locking mechanism except during refueling. If the control unit 2 determines that predetermined conditions are met after a lid switch 8 is depressed by a vehicle driver, the control unit 2 unlocks and automatically opens the fuel lid 7. After the fuel lid 7 is opened, the vehicle driver can open the filler cap 6 and refuel the fuel tank 3. The fuel lid 7 is configured to be opened manually by the vehicle driver (through manual operation by the vehicle driver outside the vehicle).

The fuel tank 3 has a pump 3a for sending fuel to the internal combustion engine (not illustrated) and a float valve 3b and a cut valve 3c that are provided at an opening of the end of the vapor passage (piping) 9. When the fuel tank is filled up, the float valve 3b blocks the opening at the end of the vapor passage (piping) 9 and thereby prevents fuel from entering the vapor passage (piping) 9. Although the cut valve 3c does not block the opening at the end of the vapor passage (piping) 9 even if the fuel tank is filled up, the cut valve 3c, when the fuel tank 3 becomes inclined, prevents the liquid level of the fuel from rising, thereby preventing fuel from entering the vapor passage (piping) 9.

The canister 13 can adsorb evaporative fuel generated in the fuel tank 3 in which fuel is stored. The canister 13 contains activated carbon or the like which adsorbs evaporative fuel.

Conversely, the canister 13 takes in air from the atmosphere and sends the air to the purge passage (piping) 18, thereby purging evaporative fuel adsorbed by the canister 13 to the internal combustion engine outside of the canister 13.

The control valve 11 is a normally-closed valve that is provided in the vapor passage 9 communicating between the fuel tank 3 and the canister 13. A normally-closed electromagnetic valve may be used as the control valve 11. With a valve biased by a biasing device seated on a valve seat, the control valve 11 is normally put in a closed valve state in which evaporative fuel delivery is blocked. If a coil of the control valve 11 becomes energized by the control unit 2, the thus excited coil generates a magnetic flux acting on a movable core, thereby causing the movable core to be attracted toward a fixed core a magnetic attractive force. The valve mounted in the movable core moves away from the valve seat against a biasing force by the biasing device, causing the control valve 11 to be put into an opened state in which evaporative fuel delivery is permitted.

The high-pressure 2-way valve 10 has a mechanical valve that combines diaphragm type positive pressure and negative pressure valves. The positive pressure valve is configured to open when a pressure of the fuel tank 3 increases by a predetermined level above a pressure of the canister 13. The thus opened valve causes high-pressure evaporative fuel in the fuel tank 3 to be delivered to the canister 13. The negative pressure valve is configured to open when a pressure of the fuel tank 3 drops by a predetermined level below a pressure of the canister 13. The thus opened valve causes evaporative fuel stored in the canister 13 to be returned to the fuel tank 3.

The purge control valve 14 is provided in the purge passage (piping) 18. The purge control valve 14 may employ an electromagnetic valve. The purge control valve 14 can perform opening control and closing control through the control unit 2.

The pressure sensors 15, 16 may employ a piezoelectric element. The pressure sensor 15 is connected to the canister 13 and can detect a pressure inside of the canister 13. Since the pressure inside of the canister 13 is equal to the pressure inside of the purge passage 18 and a pressure at the canister 13 side rather than the control valve 11 inside of the vapor passage 9, the pressure sensor 15 can substantially detect these pressures. The detected pressure is transmitted to the control unit 2.

The control unit 2 is an electrical control unit (ECU) including a central processing unit (CPU), a random access memory (RAM), a read-only memory (ROM), and an input/output circuit. Upon acquisition of an opening command issued by the lid switch 8, the control unit 2 outputs an unlocking signal to the fuel lid 7 to unlock the fuel lid 7. Also, the control unit 2 can control operation of the control valve 11, thereby switching between the opened state in which the evaporative fuel delivery through the vapor passage 9 is permitted and the closed state in which the evaporative fuel delivery through the vapor passage 9 is blocked.

Figure 2:
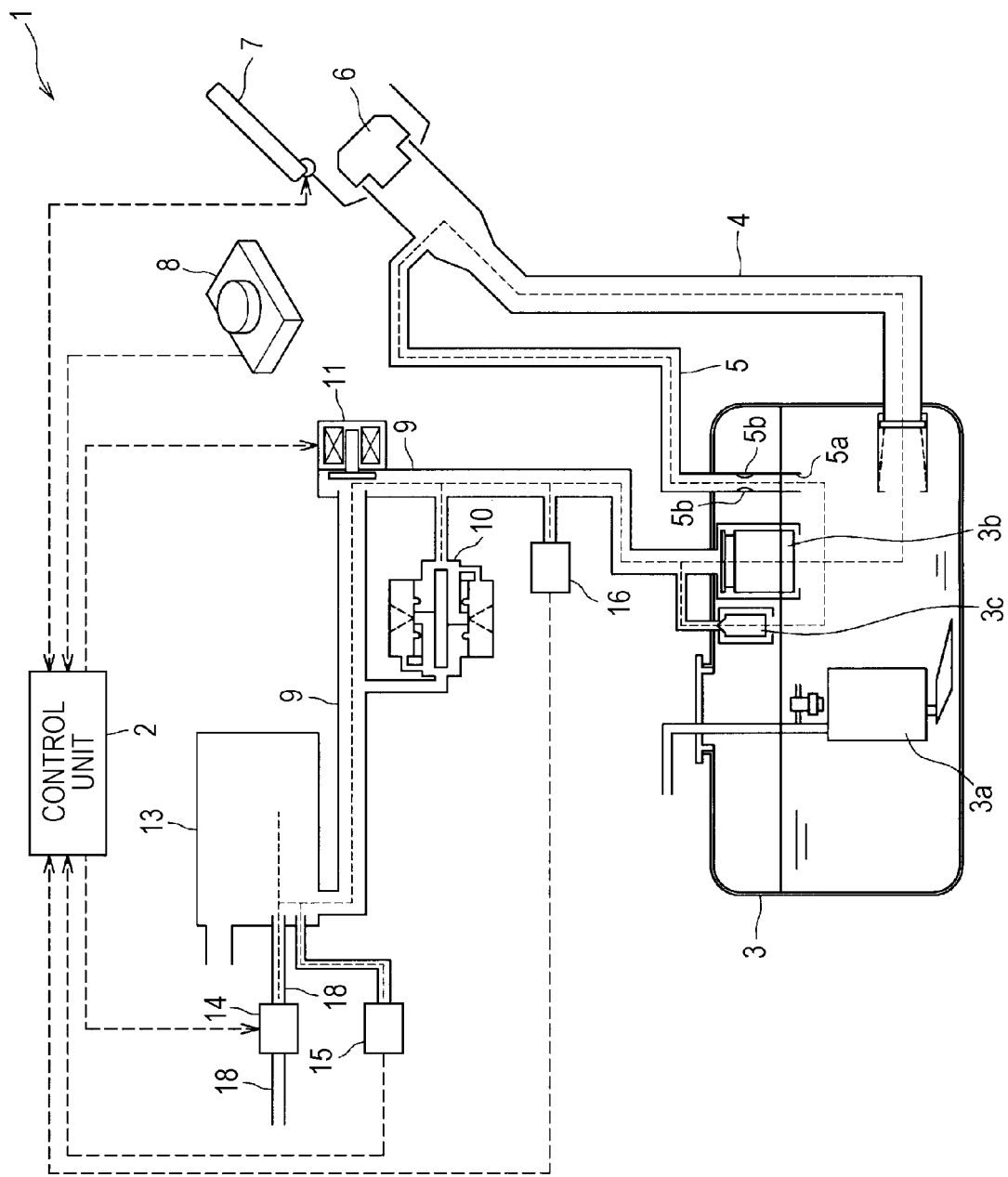
FIG. 2 is a configuration diagram of an evaporative emission control system associated with refueling according to an embodiment of the present invention.

The basic control process for controlling the fuel lid 7 and the control valve 11 through the control unit 2 is described below. Upon acquisition of an opening command issued by the lid switch 8 via the operation by a vehicle driver or the like, the control unit 2 performs opening control of the control valve 11. The control unit 2 makes a determination as to whether or not the pressure inside of the fuel tank 3 falls to a pressure level at which the lid is permitted to be opened. If the pressure falls to such a pressure level, the control unit 2 outputs an unlocking signal to the locking mechanism of the fuel lid 7 and thereby unlocks the locking mechanism to open the fuel lid 7, as shown in FIG. 2. After that, the vehicle driver opens the filler cap 6 for refueling. After the refueling event, the vehicle driver closes the filler cap 6 and then the fuel lid 7.

Figure 3A:
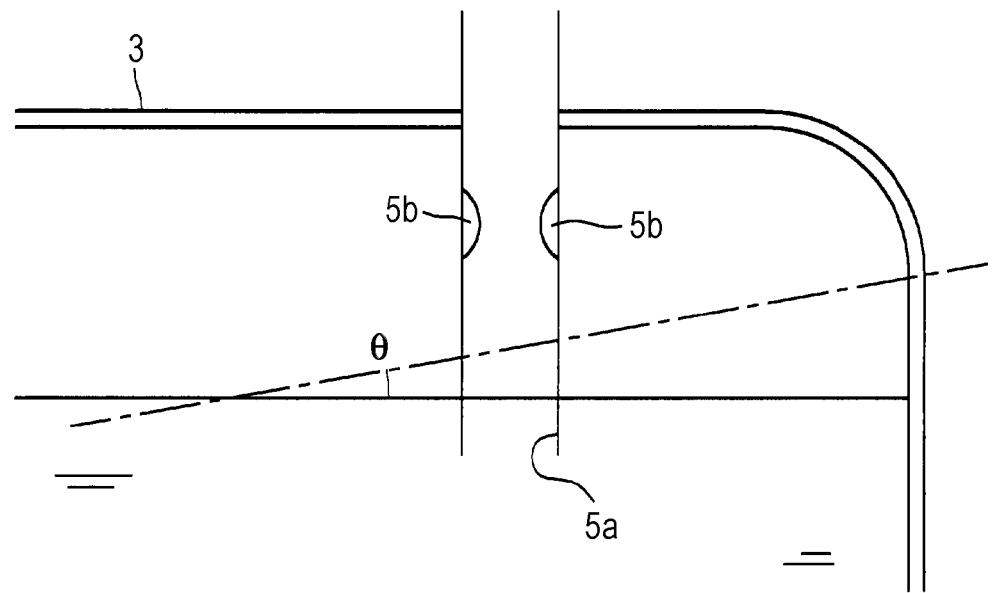
FIGS. 3A and 3B are enlarged views of a main part of FIG. 1.

As shown in FIG. 3A, the opening 5a formed at an end of the breather pipe 5 and located inside the fuel tank 3 is configured to be located below a liquid level of the fuel when a fuel level in the fuel tank 3 reaches a predetermined full level. In this embodiment, the breather pipe 5 has two holes 5b, 5b formed above a liquid level at a full fuel level. In this embodiment, the two holes 5b, 5b are disposed so as to be opposed to each other on a circumferential surface of the breather pipe 5, for example, in a longitudinal or breadthways direction. Each of the holes 5b has a circular shape, but may also have an elliptical shape. If each of the holes 5b has an elliptical shape and its long axis lies along the axial direction of the breather pipe 5, the whole of the holes 5b can be optimally prevented from being immersed in the fuel when the liquid level of the fuel becomes inclined.

If a fuel level in the fuel tank 3 reaches the full fuel level, the openings 5a of the breather pipe 5 are immersed in the fuel. At this time, the high-pressure 2-way valve 10 is in the closed state, which blocks the communication between the fuel tank 3 and the canister 13. If the fuel lid 7 and the filler cap 6 are left open with the 2-way valve closed for a long period of time, the control unit 2 performs control of the control valve 11 after a predetermined period of time elapses, causing the control valve 11 to be in the closed state which completely blocks the communication between the fuel tank 3 and the canister 13. In a conventional evaporative emission control system, since evaporative fuel in the fuel tank 3 cannot be moved to the canister 13, such evaporative fuel pressurizes the fuel in the fuel tank 3, which is likely to cause the fuel to go up through the filler pipe 4 and the breather pipe 5. The evaporative emission control system 1 according to an embodiment of the present invention, however, is provided with the holes 5b, which allow the evaporative fuel in the fuel tank 3 to be released to the outside from the holes 5b through the breather pipe 5, thereby avoiding problems (such as a fuel leakage to the outside) arising from an increase in a tank inner pressure.

Also, the evaporative emission control system 1 according to an embodiment of the present invention has the two holes 5b, 5b formed so as to be opposed to each other on a circumferential surface of the breather pipe 5, which allows one of the two holes 5b to be located above the liquid level of the fuel even if the other of the two holes 5b is immersed in the fuel when the liquid level of the fuel becomes inclined, thereby allowing the evaporative fuel to be released to the outside and avoiding problems arising from a tank inner pressure.

Preferably, the holes 5b are formed above a liquid level at a full fuel level when such a liquid level is inclined at $\theta=2$ degrees to the horizontal plane. This arrangement allows evaporative fuel to be released to the outside and thereby avoids problems arising from a tank inner pressure, even if a vehicle is parked on a slope.

Also, the total cross-sectional area of the holes 5b (the total area of the two circular holes 5b in this embodiment) is preferably smaller than the cross-sectional area of the breather pipe 5 (the area of the opening 5a). This arrangement can suppress the amount of evaporative fuel that is released to the outside.

In order to perform leakage diagnosis of the evaporative emission control system 1 using a manifold air pressure of an engine or a positive-pressure pump or negative pressure pump pressure of an external diagnostic device, the control unit 2 or the external diagnostic device allows for a pressure generated at the holes 5b in performing leakage diagnosis. In order to perform leakage diagnosis of the filler pipe 4 and the breather pipe 5, the engine manifold air pressure or the pressure generated by the external diagnostic device can be introduced even if the opening 5a is immersed in the fuel and therefore blocked at the full fuel level, thereby allowing the external diagnostic device to perform diagnosis of the filler pipe 4 and the breather pipe 5, irrespective of the fuel level in the fuel tank 3.

Figure 3B:
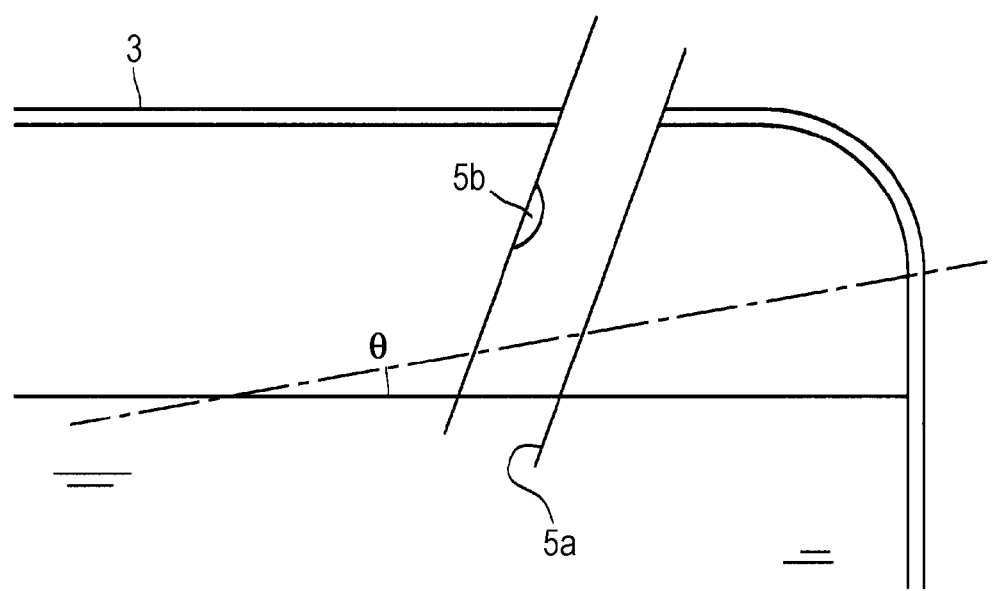

The present invention is typically described above with reference to, but not limited to, the foregoing embodiments. Various modifications are conceivable within the scope of the present invention. In an example shown in FIG. 3B, when an end portion of the breather pipe 5 is inclined inside the fuel tank 3, the hole 5b may be formed on the circumferential surface of the breather pipe 5 so as to face upward, thereby preventing the hole 5b from being immersed in the fuel. The number of the holes 5b and their shape can be appropriately varied. The number of the holes 5b may be one or more than one. The shape of the holes 5b is not limited to a circular or elliptical shape, and may be a rectangular shape or the like.

The control valve 11 may employ a ball valve in place of the normally-closed electromagnetic valve. The ball valve is fully closed when its valve opening is at 0 degree, and is fully opened when its valve opening is at 90 degrees. The valve opening of the control valve (ball valve) 11 can be detected by a valve opening detection unit (not illustrated), and the detected value of the valve opening is sent to the control unit 2. The control unit 2 can perform opening control for opening the control valve 11 and closing control for closing the control valve 11, and can perform variable control of opening or closing speed of the control valve 11, and in addition can adjust a degree of valve opening when the control valve 11 is opened. In other words, the ball valve serving as the control valve 11 is a (normally-closed) valve that can perform linear control of its opening/closing speed and its degree of valve opening.

The control valve 11 may have a three-way valve, one port of which may be connected to the pressure sensor 16 and the other two ports of which may be connected to the vapor passage 9 at the canister 13 side of the control valve 11 and to the vapor passage 9 at the fuel tank 3 side of the control valve 11, respectively. In this case, through the control of the three-way valve, the control unit 2 can connect the pressure sensor 16 to the vapor passage 9 at the canister 13 side of the control valve 11 or connect the pressure sensor 16 to the vapor passage 9 at the fuel tank 3 side of the control valve 11. If the pressure sensor 16 is connected to the vapor passage 9 at the canister 13 side of the control valve 11, the pressure sensor 16 can detect a pressure inside of the vapor passage 9 at the canister 13 side of the control valve 11 and in addition detect a pressure inside of the canister 13. The thus detected pressure should coincide with the pressure detected by the pressure sensor 15 since detections are made at the same location, allowing a calibration or a failure diagnosis of the pressure sensors 15, 16. If through the control of the three-way valve the pressure sensor 16 is connected to the vapor passage 9 at the fuel tank 3 side of the control valve 11, the pressure sensor 16 can detect a pressure inside of the vapor passage 9 at the fuel tank 3 side of the control valve 11 and in addition detect a pressure inside of the fuel tank 3. The pressure sensor 16 sends the thus detected pressure to the control unit 2.

An evaporative emission control system according to an embodiment of the present invention includes a fuel tank for storing fuel, a canister that adsorbs evaporative fuel generated in the fuel tank, a normally-closed control valve that is provided in a vapor passage communicating between the fuel tank and the canister, a filler pipe through which the fuel is delivered to the fuel tank, and a communicating passage that communicates between the fuel tank and the filler pipe and has an opening formed at an end thereof in the fuel tank, wherein the opening formed at the end of the communicating passage is located below a liquid level of the fuel when a fuel level in the fuel tank reaches a predetermined level and the communicating passage has a hole formed above the liquid level of the fuel when the fuel level in the fuel tank reaches the predetermined level.

This arrangement allows evaporative fuel in the fuel tank to be released to the outside from the hole through the communicating passage, thereby preventing a problem caused by a tank inner pressure.

Preferably, the hole is formed plurally.

More preferably, a pair of holes is formed as the plurality of holes on a circumferential surface of the communicating passage so as to be opposed to each other.

This arrangement allows one of the holes to be located above the liquid level of the fuel even if the other of the holes is immersed in the fuel when the liquid level becomes inclined, which allows the evaporative fuel to be released to the outside and thereby avoids a problem resulting from a tank inner pressure.

Preferably, a total cross-sectional area of the holes is smaller than the cross-sectional area of the communicating passage.

This arrangement can suppress the amount of evaporative fuel that is released to the outside.

Obviously, numerous modifications and variations of the present invention are possible in light of the above teachings. It is therefore to be understood that within the scope of the appended claims, the invention may be practiced otherwise than as specifically described herein.

What is claimed is:

1. An evaporative emission control system comprising:
a fuel tank to store fuel;
a canister to adsorb evaporative fuel generated in the fuel tank;
a normally-closed control valve provided in a vapor passage connecting the fuel tank to the canister, the normally-closed control valve being configured to open such that evaporative fuel flows in the canister when fuel is delivered to the fuel tank, the fuel tank including a float valve provided at an opening of the vapor passage, the float valve being configured to block the opening of the vapor passage when fuel stored in the fuel tank reaches a predetermined fuel level;
a filler pipe through which the fuel is delivered to the fuel tank; and
a breather pipe comprising:
  a communicating passage connecting the fuel tank to the filler pipe;
  an opening provided at a first end of the breather pipe in the fuel tank, the opening being located below the predetermined fuel level in the fuel tank; and
  at least one hole located above the predetermined fuel level in the fuel tank to release evaporative fuel from the at least one hole in a state where the normally-closed control valve is closed,
wherein the float valve is configured to move into a closed state to block the opening of the vapor passage when the opening at the first end of the breather pipe is located below a liquid level of the fuel in the fuel tank, and
wherein the at least one hole is a circular hole provided on the breather pipe to release the evaporative fuel in the fuel tank via the circular hole when the float valve is in the closed state.

2. The evaporative emission control system according to claim 1, wherein the at least one hole comprises a plurality of holes.

3. The evaporative emission control system according to claim 2, wherein the plurality of holes include a pair of holes provided on a circumferential surface of the breather pipe to face each other.

4. The evaporative emission control system according to claim 1, wherein a total cross-sectional area of the at least one hole is smaller than a cross-sectional area of the communicating passage.

5. The evaporative emission control system according to claim 2, wherein the predetermined fuel level is a full level of the fuel tank.

6. The evaporative emission control system according to claim 5, wherein the at least one hole is located above the full level when the fuel tank is inclined at about 2 degrees with respect to a horizontal plane.

7. The evaporative emission control system according to claim 1, wherein the breather pipe includes a second end connected to the fuel pipe.

8. The evaporative emission control system according to claim 1, wherein the at least one hole is a hole extending through a circumferential surface of the pipe portion.

9. An evaporative emission control system comprising:
   a fuel tank to store fuel;
   a canister to adsorb evaporative fuel generated in the fuel tank;
   a normally-closed control valve provided in a vapor passage connecting the fuel tank to the canister;
   a filler pipe through which the fuel is delivered to the fuel tank and which includes a first opening at a first end of the filler pipe opposite to the fuel tank;
   a controller configured to control the normally-closed control valve; and
   a breather pipe comprising:
      a communicating passage connecting the fuel tank to the filler pipe;
      a second opening provided at a second end of the breather pipe in the fuel tank, the second opening being located below a full level of the fuel tank in the fuel tank; and
      at least one hole located above the full level of the fuel tank in the fuel tank,
   wherein if the first opening is left open and the second opening is located below a liquid level of the fuel in the fuel tank for a predetermined time, the controller controls the normally-closed control valve to be in a closed state to prevent the evaporative fuel from moving from the fuel tank to the canister through the vapor passage so that the evaporative fuel is released to an outside from the first opening through the at least one hole and the breather pipe.

* * * * *